Nov. 22, 1938.  C. E. JOHNSON  2,137,530
DYNAMOMETER
Filed Oct. 18, 1935   2 Sheets-Sheet 1
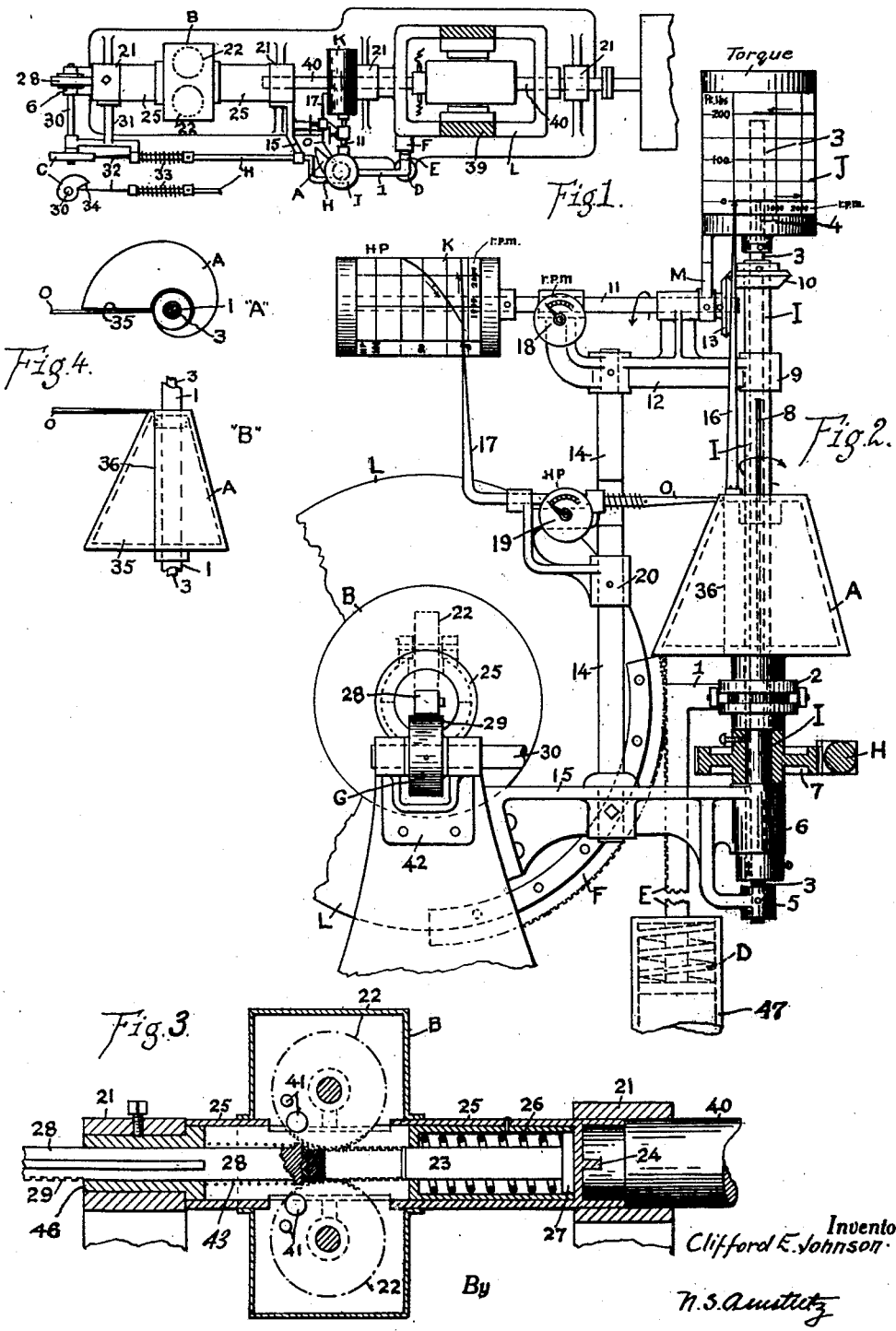
Inventor
Clifford E. Johnson
By
N. S. Amstutz
Attorney Nov. 22, 1938.  C. E. JOHNSON  2,137,530
DYNAMOMETER
Filed Oct. 18, 1935   2 Sheets-Sheet 2

Clifford E Johnson  Inventor
By  N. S. Armstead
Attorney

Patented Nov. 22, 1938

2,137,530

UNITED STATES PATENT OFFICE 2,137,530

DYNAMOMETER

Clifford E. Johnson, Knoxville, Tenn.

Application October 18, 1935, Serial No. 45,682

7 Claims. (Cl. 265—26)

My invention relates to improvements in power indicating dynamometers and it more especially consists of the features pointed out in the annexed claims.

The purpose of my invention is to provide an all around dynamometer of the absorption type which overcomes the limitation present in Prony brake testers and which is not subject to the uncertainties of testing devices heretofore employed. My form of dynamometer indicates and records the horsepower and records the torque at constant or varying speed and at the same time it indicates the speed of the engine or motor under test. I use a direct current generator which has very smooth operating characteristics. If desired any type of conventional brake may be employed for certain restricted tests, however, my electric dynamometer would even for such tests be superior. A valuable feature of my device is that the manufacturer of auto or other engines or any other power device may supply the user with an authentically produced curve that will conclusively show the actual performance of the device.

With these and other ends in view I illustrate in the accompanying drawings such instances of adaptation that will disclose the broad underlying features of the invention without limiting myself to the specific details shown thereon and described herein.

Fig. 1 is a top plan view of an electrically equipped dynamometer, showing it attached to a motor or engine at the right, which is under test.

Fig. 2 is an enlarged elevation showing the speed meter in elevation, in line therewith, the end of the generator and on the right an elevation of the compound cam with its related torque and H. P. indicating and recording drums and related actuating mechanism.

Fig. 3 is a longitudinal elevation in section of the speed-meter.

Fig. 4 shows two diagrammatic views A and B of a spirally generated compound cam with straight sides.

Figure 5:
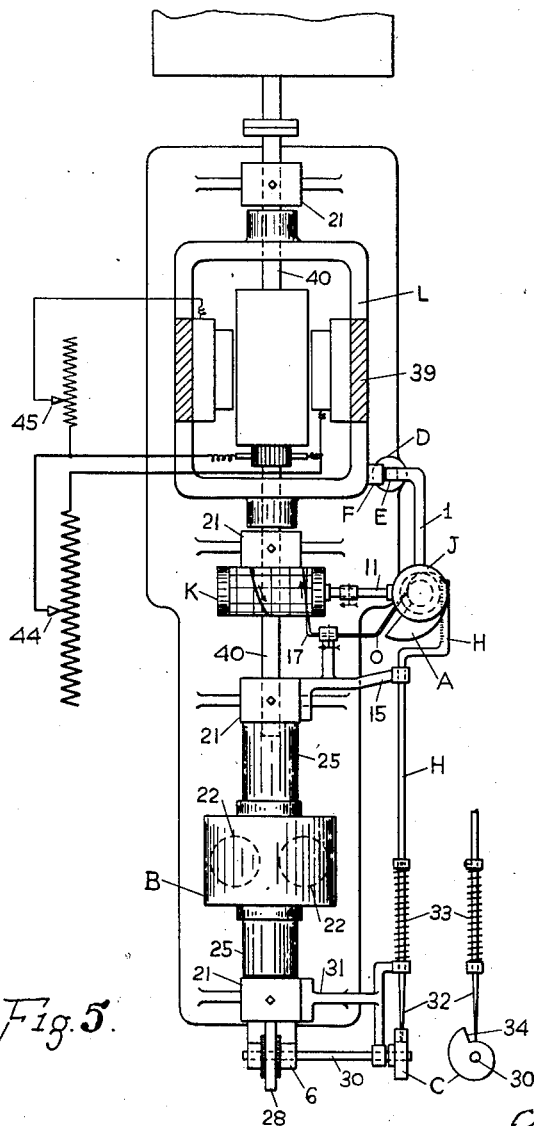
Fig. 5 is an enlarged view of Fig. 1, including the field and armature circuits, and conventional load and shunt field controls for the generator.

In the use of my device I may have recourse to whatever alternatives or equivalents of structure that the exigencies of varying operating conditions may demand without departing from the broad spirit of the invention.

As an instance of adaptation of one form of a dynamometer which indicates and records horsepower and in addition also indicates the speed and records and indicates the torque of the engine or motor that is being tested, these features are shown on the drawings. The absorption element of my dynamometer is in the form of a direct current electric generator, L. The field frame or yoke 39 may be displaced at different angles corresponding to the power conditions under which the test is being made.

The load on the generator L is readily varied conventionally by a suitable resistance control 44 which may be located adjacent to or easily accessible to the throttle control which varies the fuel input of the engine that is being tested.

I use suitable recording cylinders K and J that are removable. These cylinders contain ordinary graph paper on which the curves of the torque and the developed horsepower are drawn respectively as ordinates and the speed of the engine is indicated as abscissa, the lengths of each ordinate and abscissa for any point on either curve always being proportional to the real recorded values.

In a suppositious case, assume that an automobile engine is coupled direct to the shaft 40 of the generator-dynamometer, L, which is the armature shaft, and the throttle control of the engine is located adjacent to and within easy reach of the control 45 for the generator field current and the control 44 for the load that is put on the generator. Before the engine is started the cylinders K and J which carry the graph paper are put into place so that the recording arms or pens 16 and 17 are brought to a zero position. These recording arms are controlled by an extremely important part of the invention, viz, a compound cam, A, which may be said to be the heart of the mechanism.

It is known that in horsepower equations KNT, K is a constant, N is the engine speed and T is the corresponding torque. If now the speed of the engine, that is, N be held constant, the actual horsepower will be equal to some new constant times the torque T. For this condition the horsepower-torque curve would be a straight line. As a result of this fact the compound cam, A, upon which the ultimate performance of the device depends, is associated with cooperating mechanism that will turn it on its axis an angular displacement which will be in direct proportion to the engine speed N. At the same time as it is being moved around its axis it is raised by the rack E and extension 1, a vertical distance in direct proportion to the engine torque T.

The profile or shape of any side of the compound cam A is accurately related to the horsepower-torque curve, which will correspond to the particular speed represented by the angular displacement of the cam. The movement of the spring pressed follower O will always be a distance related to the base or shortest radius of the cam in direct proportion to the developed horsepower.

Considering that the moving elements of the dynamometer, L, would themselves absorb a negligible amount of the engine power, the extreme top surface of the compound cam, A, would coincide with its base as a true circle, however, since there is a loss in the generator due to bearing friction and windage in addition to a small loss in the related mechanism for its operation, a correction factor is incorporated in the contour of the cam. This modified contour affects the shape of all surfaces of the cam, for instance, if the maximum radius at the lower side of the cam at its base will correspond and be an indication of a maximum of one hundred horsepower and the cam should revolve through its greatest angular displacement the follower, O, would be moved a certain percentage of this radius or proportional to about five horsepower providing that no load is placed on the generator.

The correction of the contour that is made at the top of the compound cam is also present at every horizontal cross section of the cam, in the same proportion, as this correction varies with the speed and not with the torque. This feature permits the sides of the cam to be formed straight so as to require simple manufacturing expedients. If it were not for the correction factor of the contour of the cam any horizontal cross section would be a part of a true spiral. This correction factor need not be added unless very accurate results are desired or where cooperating mechanism and dynamometer bearings are so efficient that their power requirements could be neglected.

As an instance of the broad features of the invention it is obvious that the compound cam with or without the correction factor is a mechanical multiplier (Fig. 4). In the case here suggested it is used as a means of multiplying the torque by the speed. The rotation of the compound cam A (Fig. 4) thru an angular displacement proportional to the variation of the speed of the engine under test is effected by a speed meter which has centrifugal weights that are attached to gears 22, which in turn are suitably supported in the casing B. The gears mesh with teeth cut on the opposite sides of a square shaft 23 which rotates with the gears. Not all of the teeth of the gears are employed in performing the functions of the speed meter, B, but they are cut all the way around in order to control the balance and to simplify the installation of the weights on the gears. A coupling 25 fits in a slot 24 of the armature shaft 40. As the armature shaft 40 is set into motion the gears 22 revolve about the axis of the armature shaft which causes the weights 41 to move outward and thus partially rotate the gears and move the squared rotating shaft 23 lengthwise to a distance that is as nearly as possible in proportion to the speed of the engine under test. The coupling 25 is supported by and rotates on the sleeve 46 in standard 21.

This lengthwise movement of shaft 23 causes two other effects, viz, the compression of a spring 26 by the square sliding collar 27 at the extreme right end of the shaft, and the identical lengthwise movement of a second square, non-rotating, shaft 28 which is supported by a slot arrangement in the sleeve 46 of the bearing standard 21 and is held against the rotating shaft thrust bearings by a suitable spring arrangement 43. The non-rotating shaft 28 has teeth 29 cut on its lower side to contact with pinion, G, on a horizontal shaft 30, which is supported in the bearing bracket 42.

This pinion G actuates a cam, C, against which a follower 32 of the rack rod H rests. The follower may be held in engagement with the irregular contour of the cam in any desired manner as by a spring 33. It actuates a vertical tubular shaft, I, through a rack. On this shaft the compound cam A is positioned, that is, a movement to and fro of the follower 32 will move the cam A thru an angular displacement corresponding directly to the speed of the engine. The shaft, I, extends upward on a stationary rod 3 and it is splined at 8 in the cam A and at the upper end of the rod 3 a torque-speed recording cylinder J is splined at 4. By suitable means, the cylinder is slightly lowered as the speed increases in order that the torque consumed by the moving elements of the mechanism will be accounted for in the torque curve. This slight up and down movement of the cylinder is regulated by a cam, M, on the shaft 11 whose contour (not shown) is determined or rather confirmed by actual tests that will show the power consumed by the dynamometer at various speeds. This compensating cam feature is necessary only where extreme accuracy is desired.

A horsepower-speed recording cylinder, K, is rotated from the vertical cam shaft, I, at right angles to the latter by shaft 11. On this cylinder the horsepower of the engine will be recorded by the finger 17, in relationship to the speed. The recording finger 16 for the torque cylinder J is fixed to the top of the compound cam A and the recording finger 17 for the horsepower cylinder K is moved parallel to the axis of the cylinder which rotates variably with changes in engine speed, by a follower, O, supported on bracket 20. It is moved through varying radii by the compound cam A. This axial movement may be magnified by any suitable mechanism in order to obtain a taller curve. As the compound cam is moved through varying angular displacements, according to the speed of the engine, and the cam is variably raised on its shaft by the extension 1 and grooved collar 2 according to the torque factor of the mechanism under test, its movement causes the torque recording finger 16 to move up and down adjacent the torque cylinder, as well as around it.

The up and down movement of the compound cam is proportional to the angular displacement of the yoke or field frame 39 of the generator, L. A simple means by which this is accomplished may comprise an arcuate rack F, secured to the field frame, the teeth of that mesh with the teeth of a vertical rack E, which, as the yoke moves angularly, causes the rack to be moved endwise against a compression spring D in the tube 41. The upper end of the vertical rack has an extension 1 that engages a collar 2 at the lower end of the compound cam so as to raise and lower the cam on its tubular shaft I at the same time that it is being rotated proportionally to the speed of the engine, by the rack H and the gear 7.

The operation of the dynamometer in securing a maximum horsepower curve and the corresponding torque-speed curve, will be substantially as follows:—

During the test, the operator has full view of the indicators of the speed, at 18 and the horsepower at 19 to observe these characteristics as desired or of necessity. Such indicators are easily installed since each of the factors are represented by proportional displacement of some mechanism. The indicator 18 is supported by the bracket 12 and the indicator 19 by the bracket 20.

After the chart blanks have been properly positioned on the recording cylinders, K and J, the engine or motor to be tested is connected to the dynamometer and speeded up, without loading, past a point where it is presumed the maximum horsepower will occur. This operation, thru the function of the speed meter Fig. 3, and its cooperating cam C, will cause speed responsive shafts I and II to rotate a maximum angular displacement proportional to the speed causing three effects, namely, (1) the rotation of compound cam A and the traverse of its integral torque recording arm 16 about the non-rotated cylinder J, (2) the slightly lowering of cylinder J by the torque-compensating cam M during its traverse by recording arm 16, and, (3) the slight displacement of follower O by compound cam A during the rotation of cylinder K. Up to this time the indications and recordings of power and torque will be due only to friction in the cooperating mechanism.

After this condition has been attained the operator applies a load by means of the dynamometer at the same time increasing the input to the motor so that a maximum load is obtained without decrease in speed. When this load is applied, yoke L tends to turn with the driving element so that arcuate rack F raises rack E which in turn compresses spring D so that its displacement is proportional to the torque. Compound cam A, being collared to rack E at I is also raised so that its attached recording finger 16 makes proper registration on cylinder J while follower O, and its integral recording finger 17 is displaced proportional to the horsepower and registration made on cylinder K.

The useful part of the curves will then be drawn by the recording fingers 16 and 17 as the operator gradually increases the load while maintaining maximum input. Naturally then, with the speed decreasing the horsepower will gradually increase until the peak is reached after which it will decline until shut off, while the corresponding torque will always be correctly recorded. After shut off, the graphs may be removed with their accurate results recorded in the form of curves whose ordinate and abscissa lengths are in proportion to the real values.

The engine that is being tested is speeded up past a point where it is presumed the maximum horsepower will be obtained. Assuming this to be about 4000 R. P. M., the speed responsive shafts I and II will have turned a maximum angular displacement and the recording finger 17 will have drawn a long curve on its graph paper on cylinder K, showing a rather gradual increase of horsepower until about 5 horsepower is indicated. This will represent the power consumed by the moving elements of the mechanism. In the meantime the other recording finger 16 will have traveled almost completely around the torque cylinder J which at the same time has been slightly lowered by the small compensating cam, M, on the shaft II so that a small torque is indicated at the maximum speed of 4000 R. P. M.

After this condition has been attained the operator will coordinate the conventional generator field current control 45, the generator load control 44 and the engine throttle (not shown) in such a manner that the load will be as great as possible at 4000 R. P. M. with the engine throttle wide open. This will not require a maximum load since the engine friction is consuming a considerable portion of the developed power. During this operation the recording finger or arm 17 will have moved a little further lengthwise of the horsepower cylinder K, while that cylinder has not yet turned on its axis and the other recording finger 16 will have been raised higher in a straight line so that both the power and torque curves will show an increase at a constant speed of 4000 R. P. M.

After this the operator will then gradually increase the load of the generator while at the same time keeping the engine throttle wide open. This will cause the engine to gradually slow down and at the same time the developed horsepower will increase up to a certain point, after which it will steadily decrease until the engine or motor is stopped at approximately 500 R. P. M.

It is of course desirable that all the changes be made as gradual and as steadily as possible so that the indications and the recordings will not include power used in the acceleration and deceleration of the moving parts. The cylinders J and K containing the graphs may then be removed and the papers containing the curves detached. By observing the power curve one can immediately determine at what speed the maximum horsepower will occur and what its magnitude will be. The torque may be found for that corresponding speed from the other curve.

The stationary shaft 3 around which the tubular shaft I revolves, is supported at its lower end by a bracket 5 and the tube I has a separate bearing 6, forming with the bracket 5 a support 15 which is attached to one of the main bearings 21. The bracket 15 also supports the rod 14 to which the bracket 12 is attached at the upper end of the rod. The rod also supports the bracket 20. The upper end of the tubular shaft I is supported in the bearing 9, and the tube has attached, above the bearing 9, a bevel gear 10 which meshes with a bevel gear 13 on the shaft 11. The shaft 30 near the cam C and the rack rod H are supported by a bracket 31.

The cams A and C have radial faces respectively, cam A at 35 and cam C at 34 and multiplying cam A has a vertical face 36 parallel with the axis of the tubular shaft I and from a true circle at its upper end it merges into a true spiral which is modified on succeeding lower planes.

What I claim is:—

1. In absorption dynamometers or analogous devices adapted to simultaneously indicate and record the torque the speed and the resulting horsepower of a mechanism under test, an electric generator, an armature therefor connected to the shaft of the device under test, a field magnet frame adapted to oscillate around the axis of the armature, a speed-meter, a rotatable and axially movable straight sided compound cam, a support for the cam, means associated with the speed meter and the oscillating field magnet to respectively rotate the cam and simultaneously raise it proportional to the speed and torque of the device under test, and means engaging the cam to simultaneously show the horse-power output of the device under test.

2. A straight sided compound cam having angularly disposed surfaces of varying radii, means for displacing the cam rotatively in proportion to the speed of a device under test, means for variably moving the cam axially according to the torque of the device under test, indicating means carried by the cam, a support for the cam permitting it to have free rotative and axial movement, and translating means engaging the surface of the cam for recording the compound movement of the cam as a direct reading of the horsepower of the device under test.

3. In self-indicating and recording dynamometers, for testing power devices, connections from a power device to a torque responsive electric dynamometer, means for transferring the extent of an imposed torque into a proportional displacement of cooperative mechanism, means for transferring the rate of rotation of the power device into a separate proportional displacement of cooperating mechanism, means whereby these two interrelated proportional displacements actuate a double-movement conical shaped straight sided cam simultaneously, a follower actuated by the cam surface, an indicator carried by the cam, and recording means for visualizing the movement of the follower and the indicator.

4. In absorption type dynamometers, a mechanism subject to speed control, a separate mechanism subject to torque control, means for combining the operation of both mechanisms to actuate a straight-sided compound cam axially and rotatively, a support for the mechanisms and cam, torque recording means carried by the cam, a separate support for a translating device that is in engagement with the surface of the cam, and means associated with the translating device for recording the compound movements of the cam into a direct reading of horsepower of which the rotary movement of the cam represents the speed and the axial movement of the cam represents the torque.

5. In absorption dynamometers, a straight-sided compound cam having an exterior surface of varying radii, a rotating tubular shaft for the cam, a suitable support for the shaft, means for moving the cam axially on the tube proportionally to the torque, means for moving the cam rotatively proportionate to the speed, cooperating means carried by the cam to record the variable movements rotary and lengthwise of the axis of the cam, and a translating member mounted on a projection of the shaft's support, said member adapted to engage the variable radius surface of the cam at all times to record the resultant compound movements of the cam as direct reading values of horsepower which are a resultant of the interrelated variations of the speed and torque.

6. In recording dynamometers, an electric generator comprising an armature secure to its shaft, suitable bearings for the shaft, a field magnet frame, separate bearings therefor concentric with the armature shaft, a field and a load control for the generator, suitable means for connecting the armature shaft to a power device to be tested, an extension of the generator shaft, a speed-meter actuated by the extension, a compound cam, a support therefor, means for producing variably rotative displacement of the cam by the speed-meter, means for variably raising the cam by torque oscillations of the magnet frame, and means actuated by the cam surface to record the resultant of torque and speed as horsepower.

7. In absorption dynamometers, comprising an electric generator, an armature and shaft therefor, a coupling at one end of the shaft, a speed-meter connected to the other end of the shaft, a compound straight sided cam, a hollow shaft therein, a support for the shaft, a connection from the speed-meter for rotating the cam, a field magnet adjacent the armature, a frame for the field magnet pivoted centrally with the armature shaft, connections from the magnet frame to the compound cam adapted to raise it as directed by the torque oscillations of the magnet frame, a pointer attached to the cam adapted to move with it to record unmodified changes of rotation and rise and fall of the cam representative of torque of the device under test, a follower engaging the surface of the cam at varying distances from its center such distances being representative of the combined effect of the movements of the speed-meter and the magnet frame as a true reading of horsepower.

CLIFFORD E. JOHNSON.